United States Patent
Moser et al.

(10) Patent No.: US 9,975,988 B2
(45) Date of Patent: *May 22, 2018

(54) EPOXY RESINS COMPRISING A PYRAZINE-CONTAINING COMPOUND

(71) Applicant: 3M INNOVATIVE PROPERTIES COMPANY, St. Paul, MN (US)

(72) Inventors: William H. Moser, Edina, MN (US); Mary M. Caruso Dailey, Maplewood, MN (US); Mark A. Smith, Austin, TX (US); Krishnamurthy Sridhar, West St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 382 days.

This patent is subject to a terminal disclaimer.

(21) Appl. No.: 14/782,625

(22) PCT Filed: May 2, 2014

(86) PCT No.: PCT/US2014/036547
§ 371 (c)(1),
(2) Date: Oct. 6, 2015

(87) PCT Pub. No.: WO2014/186151
PCT Pub. Date: Nov. 20, 2014

(65) Prior Publication Data
US 2016/0068627 A1  Mar. 10, 2016

Related U.S. Application Data

(60) Provisional application No. 61/823,111, filed on May 14, 2013.

(51) Int. Cl.
| | | |
|---|---|---|
| *C08L 63/00* | (2006.01) |
| *C08G 59/50* | (2006.01) |
| *C08K 5/3462* | (2006.01) |
| *C08G 59/24* | (2006.01) |
| *C08G 59/62* | (2006.01) |
| *C09D 163/00* | (2006.01) |
| *C09J 5/00* | (2006.01) |
| *C09J 163/00* | (2006.01) |
| *F16L 9/14* | (2006.01) |

(52) U.S. Cl.
CPC ....... *C08G 59/5073* (2013.01); *C08G 59/245* (2013.01); *C08G 59/621* (2013.01); *C08K 5/3462* (2013.01); *C08L 63/00* (2013.01); *C09D 163/00* (2013.01); *C09J 5/00* (2013.01); *C09J 163/00* (2013.01); *F16L 9/14* (2013.01); *C08L 2205/02* (2013.01); *C08L 2205/05* (2013.01)

(58) Field of Classification Search
CPC .................................................. C08G 59/5073
See application file for complete search history.

(56) References Cited

U.S. PATENT DOCUMENTS

| | | | |
|---|---|---|---|
| 3,530,093 A | 9/1970 | Maurer | |
| 3,928,351 A | 12/1975 | Donald | |
| 3,931,109 A | 1/1976 | Martin | |
| 4,122,128 A | 10/1978 | Lehmann | |
| 4,511,698 A | 4/1985 | Matoba | |
| 4,895,702 A * | 1/1990 | Fischer | C09K 8/54 252/392 |
| 4,910,270 A * | 3/1990 | Maekawa | B32B 27/04 525/423 |
| 5,503,937 A * | 4/1996 | Bertram | B29C 67/246 252/182.23 |
| 5,859,153 A | 1/1999 | Kirk | |
| 6,121,405 A | 9/2000 | Lee | |
| 7,001,938 B2 | 2/2006 | Watkins | |
| 8,969,577 B2 | 3/2015 | Nesvadba et al. | |
| 2008/0265438 A1 | 10/2008 | Asano | |

FOREIGN PATENT DOCUMENTS

| | | |
|---|---|---|
| CA | 2042858 | 11/1991 |
| JP | H4-227924 | 8/1992 |
| JP | 2009-173812 | 8/2009 |
| JP | 2012-209949 | 4/2012 |
| WO | WO 1995-05411 | 2/1995 |
| WO | WO 2009-094235 | 7/2009 |
| WO | WO 2010-096345 | 8/2010 |
| WO | WO 2014-186101 | 11/2014 |

OTHER PUBLICATIONS

Chen, "Amphiphatic Piperazine, Pyrazine and Pyridine Derivaties as the Thermal Latency for Epoxy-Phenolic Resins," Polymer Journal, 2009, vol. 41, No. 8, pp. 685-690.
Meng, "Epoxy resin cured with poly (4-vinyl pyridine)", Journal of Materials Science, 2005, vol. 40, pp. 6367-6373.
Ozturk, "New Polymers from Epoxidized Soybean Oil with Pyridine Derivatives", Journal of Applied Polymer Science, 2011, vol. 121, pp. 2976-2984.
Xue, "Polymerization of Styrene Oxide with Pyridine", Makromolekulare Chemie, Rapid Communications 1986, vol. 7, No. 1, pp. 37-41.
International Search Report for PCT International Application No. PCT/US2014/036547, dated Oct. 24, 2014, 4pgs.

* cited by examiner

Primary Examiner — Wenwen Cai
(74) Attorney, Agent, or Firm — Julie Lapos-Kuchar

(57) ABSTRACT

Described herein is a curable composition comprising: a crosslinkable epoxy resin; a curing agent; and a compound, wherein the compound comprises a pyrazine moiety but not a primary amine.

6 Claims, No Drawings

EPOXY RESINS COMPRISING A PYRAZINE-CONTAINING COMPOUND

CROSS REFERENCE TO RELATED APPLICATIONS

This application is a national stage filing under 35 U.S.C. 371 of PCT/US2014/036547, filed May 2, 2014, which claims priority to U.S. Provisional Application No. 61/823,111, filed May 14, 2013, the disclosure of which is incorporated by reference in its/their entirety herein.

TECHNICAL FIELD

An epoxy resin comprising a curing agent and a compound comprising a pyrazine moiety is described along with methods of making and articles thereof.

SUMMARY

There is a desire for epoxy resin compositions that have improvements in manufacturing and/or performance.

In one aspect, a curable composition is described comprising: a crosslinkable epoxy resin; a curing agent; and a compound comprising a pyrazine moiety wherein the compound does not comprise a primary amine.

In another aspect, an article is described comprising a substrate and the cured composition wherein the cured composition is derived from the reaction of a crosslinkable epoxy resin; a curing agent; and a compound comprising a pyrazine moiety wherein the compound does not comprise a primary amine, wherein the cured composition is located on a surface of the substrate.

In yet another aspect, a method of making adhering substrates is described comprising: providing a curable epoxy resin composition between a first substrate and a second substrate, wherein the curable epoxy resin composition comprises: a crosslinkable epoxy resin; a curing agent; and a compound comprising a pyrazine moiety wherein the compound does not comprise a primary amine; and curing the curable epoxy resin composition.

In another aspect, an article is described comprising a substrate having an outer surface and a coating deposited on at least a portion of the outer surface, wherein the coating comprises a crosslinkable epoxy resin; a curing agent; and a compound comprising a pyrazine moiety wherein the compound does not comprise a primary amine.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term
"a", "an", and "the" are used interchangeably and mean one or more; and
"and/or" is used to indicate one or both stated cases may occur, for example A and/or B includes, (A and B) and (A or B).

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The present disclosure is directed towards epoxy resin compositions that comprise a compound comprising a pyrazine moiety. As will be discussed below, when utilizing these pyrazine-containing compounds, benefits in the manufacture and/or performance of the epoxy resins are realized.

Epoxy resins generally include a plurality of epoxy or oxirane groups. The epoxy groups can react to form a network, typically either through homopolymerization or through addition polymerization with an epoxy curing agent. As used herein, the term "epoxy curing agent" is meant to refer to an agent (or mixture of agents) having three or more reactive sites available for reaction with oxirane groups. As a result of such a structure, an epoxy curing agent can generate a network; i.e. a significantly cross-linked system.

Useful crosslinkable epoxy resins in the present disclosure are those known in the art. The crosslinkable epoxy resins or epoxides may be any organic compound having at least one oxirane ring that is polymerizable by ring opening, i.e., an average epoxy functionality greater than one, and preferably at least two. The epoxides can be monomeric or polymeric, and aliphatic, cycloaliphatic, heterocyclic, aromatic, hydrogenated, or mixtures thereof. Preferred epoxides contain more than 1.5 epoxy groups per molecule and preferably at least 2 epoxy groups per molecule. The useful materials typically have a weight average molecular weight of about 150 g/equivalent to about 10,000 g/equivalent, and more typically of about 180 g/equivalent to about 2,000 g/equivalent. The molecular weight of the crosslinkable epoxy resin is usually selected to provide the desired properties of the cured epoxy.

Crosslinkable epoxy resins may include resins based on bisphenol A, resins based on bisphenol F, epoxy cresol novolac resins, epoxy phenol novolak resins, and isocyanate-modified epoxy resins.

Exemplary crosslinkable epoxy resins include linear polymeric epoxides having terminal epoxy groups (e.g., a diglycidyl ether of a polyoxyalkylene glycol), polymeric epoxides having skeletal epoxy groups (e.g., polybutadiene polyepoxy), and polymeric epoxides having pendant epoxy groups (e.g., a glycidyl methacrylate polymer or copolymer), and mixtures thereof. The crosslinkable epoxy resins include compounds having the general formula:

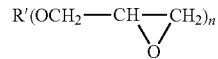

wherein: R' is alkyl, alkyl ether, or aryl group, and n is an integer between 2 and 6.

Exemplary crosslinkable epoxy resins also include aromatic glycidyl ethers, e.g., such as those prepared by reacting a polyhydric phenol with an excess of epichlorohydrin, cycloaliphatic glycidyl ethers, hydrogenated glycidyl ethers, and mixtures thereof. Such polyhydric phenols may include resorcinol, catechol, hydroquinone, and the polynuclear phenols such as p,p'-dihydroxydibenzyl, p,p'-dihydroxydiphenyl, p,p'-dihydroxyphenyl sulfone, p,p'-dihydroxybenzophenone, 2,2'-dihydroxy-1,1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane. Also useful are polyhydric phenolic formaldehyde condensation products as well as polyglycidyl ethers that contain as reactive groups only epoxy groups or hydroxy groups. Combinations of more than one crosslinkable epoxy resin or more than one type of epoxy resin may be used.

Examples of commercially available crosslinkable epoxy resins useful in the present disclosure those available under the trade designations "EPON 828", "EPON 1001", "EPON 1004", "EPON 2004", "EPON 1510", and "EPON 1310" available from Hexion Specialty Chemicals, Columbus, Ohio; "D.E.R. 331" "D.E.R. 332", "D.E.R. 334", "D.E.R. 439", "D.E.R. 667E", "D.E.R. 642UE", "D.E.R. 6116", and "D.E.R. 6508" available from Dow Chemical Company, Midland, Mich.; "ARALDITE GT 1804" and ARALDITE ECN 1280" from Huntsman Corp., The Woodlands, Tex.; diglycidyl ethers of bisphenol F (e.g., that available under the trade designation "EPICLON 830" available from DaiNippon Ink and Chemicals, Inc.); silicone resins containing diglycidyl epoxy functionality; 1,4-butanediol diglycidyl ethers, and the "ERL" series of resins available from Union Carbide, such as 3,4-epoxycyclohexylmethyl-3,4-epoxycyclohexanecarboxylate, bis-(3,4-epoxycyclohexyl) adipate, and 2-(3,4-epoxycyclohexyl-5,5-spiro-3,4-epoxy)cyclohexene-meta-dioxane.

In one embodiment, the crosslinkable epoxy resin has a softening temperature of greater than 75° C., 80° C., 90° C., or even 100° C.

Epoxy containing compounds having at least one glycidyl ether terminal portion, and preferably, a saturated or unsaturated cyclic backbone may optionally be added to the composition as reactive diluents. Reactive diluents may be added for various purposes such as to aid in processing, e.g., to control the viscosity in the composition as well as during curing, to flexibilize the cured composition, and to compatibilize materials in the composition. Examples of such diluents include: diglycidyl ether of cyclohexane dimethanol, diglycidyl ether of resorcinol, p-tert-butyl phenyl glycidyl ether, cresyl glycidyl ether, diglycidyl ether of neopentyl glycol, triglycidyl ether of trimethylolethane, triglycidyl ether of trimethylolpropane, triglycidyl p-amino phenol, N,N'-diglycidylaniline, N,N,N',N',-tetraglycidyl meta-xylylene diamine, and vegetable oil polyglycidyl ether. Reactive diluents are commercially available under the trade designation "HELOXY 107" from Momentive, Columbus, Ohio.

Also included in the composition of the present disclosure is an epoxy curing agent. Such curing agents include those conventionally used for curing epoxy resin compositions and forming cross-linked polymer networks. Such curing agents include: a phenolic hardener, an amine, a carboxylic acid and carboxylic acid functional resins, an anhydride, a thiol, a polyamide, a dihydrazide, dicyandiamide, fluorene diamine, and combinations thereof.

In one embodiment, the epoxy curing agent is a phenolic hardener. Exemplary phenolic hardeners include: epoxy resins terminated with phenol, cresol or bisphenol A, novolac phenolic resins, and cresol novolac resins.

In one embodiment, the epoxy curing agent is an amine. In one embodiment, the epoxy curing agent is an aliphatic and/or aromatic primary amine, for example: di(4-aminophenyl)sulfone; di-(4-aminophenyl)ether; and 2,2-bis(4-aminophenyl)propane. In another embodiment, the epoxy curing agent is an aliphatic and aromatic secondary or tertiary amine such as dimethylaminopropylamine and pyridine, excluding pyrazines. In yet another embodiment, the epoxy cure agent is a guanidine such as tetramethyl guanidine. In yet another embodiment, the epoxy cure agent is a diaminediarylsulfone.

In one embodiment, the epoxy curing agent is a carboxylic acid or carboxylic acid functional resin. Exemplary carboxylic acids include dodecanoic acid and adipic acid. Carboxylic acid functional resins include carboxyl terminated polyester resins made from the reaction of adipic acid, succinic acid, terephthalic acid or isophthalic acid with 1,4-butanediol, neopentyl glycol, or ethylene glycol.

In one embodiment, the epoxy curing agent is an acid anhydrides of carboxylic acids. Exemplary acid anhydrides of carboxylic acids include: benzophenone tetracarboxylic dianhydride, phthalic anhydride, and tetrahydrophthalic anhydride.

In one embodiment, the epoxy curing agent is a thiol. Exemplary thiols include: butane thiol, and pentaerythritol tetra(3-mercaptopropionate).

In one embodiment, the epoxy curing agent is polyamide.

In one embodiment, the epoxy curing agent is a dihydrazide such as aminodihydrazide. Exemplary dihydrazides include: adipic dihydrazide, isophthalic dihydrazide, and valine dihydrazide.

In one embodiment, the epoxy curing agent is dicyandiamide compound including analogs of dicyandiamide which are known in the art.

In one embodiment, the epoxy curing agent is a fluorene diamine Substituted fluorine(s) may be used as a chain extending agent, which can influence the final properties of the cured resin. Exemplary fluorine diamines include: 9,9'-bis (3-methyl-4-aminophenyl) fluorene and 9,9'-bis (3-chlorine-4-aminophenyl) fluorene.

Examples of suitable commercially available epoxy curing agents include those under the trade designations: "DICYANDIAMID AB 04", available from Degussa Corporation, Parsippany, N.J.; "DEH 85" and "DEH 87 Epoxy Curing Agent", available from Dow Chemical Corporation, Freeport, Tex.; "AMICURE CG", "AMICURE CG-NA", "AMICURE CG-325", "AMICURE CG-1200", "AMICURE CG-1400", "DICYANEX 200-X", "DICYANEX 325", and "DICYANEX 1200", available from Air Products and Chemicals, Inc., Allentown, Pa.; "DYHARD 100M", available from AlzChem LLC, Atlanta, Ga.; and "ARADUR 3082", "ARADUR 9664-1", and "ARADUR 9690" available from Huntsman Advanced Materials, The Woodlands, Tex.

The amount of epoxy curing agent needed will vary from resin to resin and is generally provided in such an amount as to be effective in causing substantially complete curing within a desired length of time. The amount of epoxy curing agent needed will vary based on the crosslinkable epoxy resin used as well as the epoxy curing agent selected. The amount of epoxy curing agent needed is normally related to the stoichiometry of the epoxy resin and the curing agent. The actual amount of curing agent to be used can be determined experimentally by determining the relationship between the amount of curing agent added and the resulting properties of the cured epoxy resin. In one embodiment, the amount of curing agent needed may be at least 1%, 2% or even 3% by weight based on the weight of the crosslinkable epoxy resin. In one embodiment, the amount of curing agent needed may be no greater than 50%, 60%, 70%, 75% or even 80% by weight based on the weight of the crosslinkable epoxy resin. In one embodiment of the present disclosure, the epoxy curing agent is 1-5%, by weight of based on the crosslinkable epoxy resin.

In one embodiment of the present disclosure, a cure catalyst is used to cure the crosslinkable epoxy resin (instead of, or in addition to, the epoxy curing agent). Such cure catalysts include imidazole compounds or a boron trifluoride complex such as $BF_3$-monoethanolamine.

In the present disclosure, a compound comprising a pyrazine moiety is added the crosslinkable epoxy resin and the epoxy curing agent to form the curable composition. This compound comprising a pyrazine moiety is a low molecular weight compound having a weight of at least 95, 120, 200, or even 300 grams/mole and no more than 500, 600, 800, 1000, 1200, 1500, 1800, or even 2000 g/mole. The compound comprising a pyrazine moiety does not include a primary amine.

In one embodiment, the compound is of the following formula:

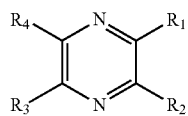

wherein $R_1$-$R_4$ is independently selected from at least one of: —Cl; —CN; —OH; —OR; —NHR'; $NR'_2$; —NC(O)R'; —NC(O)NHR'; aryl; phenol; heteroaryl; and a C1-C20 alkyl, alkenyl, or alkynyl, which are optionally substituted with —OH, —SH, —NHR', —$NR_2'$, —$CO_2H$, —CN, —NCO, aryl, heteroaryl, and phenol; wherein R' is independently selected from at least one of a C1-C4 alkyl, aryl, heteroaryl, pyrazyl, 2-hydroxyphenyl, 3-hydroxyphenyl and 4-hydroxyphenyl.

In one embodiment, the compound may be selected from the general formulas:

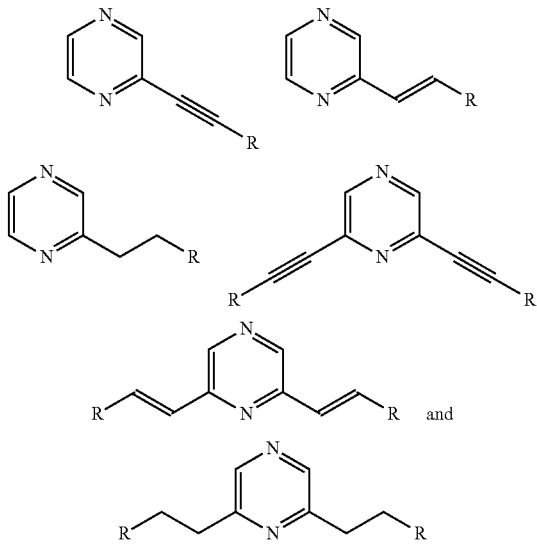

wherein R is independently selected from at least one of a C1 to C4 alkyl, which may be optionally substituted by at least one of —OH, aryl, heteroaryl, pyrazyl, 2-hydroxyphenyl, 3-hydroxyphenyl, and 4-hydroxyphenyl group;

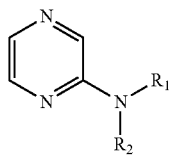

wherein $R_1$ is selected from at least one of —H, benzyl, and C1 to C6 alkyl group and $R_2$ is selected from at least one of —C(O)R', —C(O)NHR', —C(OH)R', benzyl, and a C1 to C6 alkyl group, wherein R' is selected from at least one of a C1 to C6 alkyl, aryl, benzyl or heteroaryl group;

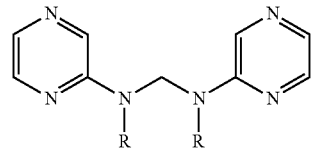

wherein R is independently selected from at least one of —H and a C1 to C6 alkyl group; and

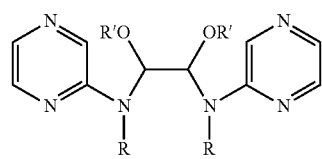

wherein R is independently selected from at least one of —H and a C1 to C6 alkyl group or wherein the two Rs form a —$CH_2$— bond; and R' is independently selected from at least one of —H and a C1 to C6 alkyl group.

Exemplary compounds include:

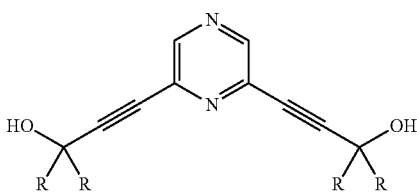

wherein R is selected from at least one of H, and $CH_3$, or the two adjacent R groups join to form a cyclohexane ring; and

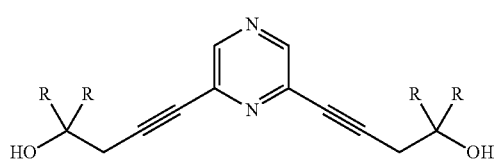

wherein R is selected from at least one of H, and $CH_3$, or the two adjacent R groups join to form a cyclohexane ring.

Such exemplary compounds are disclosed in U.S. Provisional Appl. No. 61/822,939, filed May 14, 2013, the disclosure herein incorporated by reference in its entirety The amount of compound comprising a pyrazine moiety needed will vary depending on the compound selected, the crosslinkable epoxy resin employed, the curing agent used, and the amounts of these materials. A typical composition according to the present disclosure includes at least 0.05, 0.1, or even 0.5% and at most 0.8, 1, 1.5, or even 2% by weight of the compound comprising the pyrazine moiety versus the weight of the crosslinkable epoxy resin. Even though they may be present in small amounts, these compounds comprising the pyrazine moieties may improve the manufacturing and/or performance of the epoxy resin composition.

As disclosed above, common curing agents for epoxy resin are compounds that contain either one or more reactive amine groups or one or more reactive phenolic hydroxyl groups. Dicyandiamide (DICY) is one of the most common curing agents for epoxy resins in industrial applications, and typically provides cured products with excellent mechanical and physical properties. However, the relatively low solubility of DICY in epoxy resins necessitates a curing temperature near to DICY's melting point of 190° C., which is a drawback for applications in which faster curing at lower temperatures is desirable. Thus, the development of epoxy cure accelerators represents an important area of research in the field of solid epoxy resin coatings. Although compounds such as tertiary amines, imidazoles, and ureas have commonly been utilized to accelerate the curing of epoxy-DICY systems, the discovery of new accelerants is desirable for the development of epoxy coatings that can be cured under specific conditions. In one embodiment, it has been discovered that the addition of a compound comprising a pyrazine moiety can be added to a composition comprising a crosslinkable epoxy resin and curing agent to impact the cure. As can be seen in the examples disclosed herein, the compound comprising a pyrazine moiety may be used to decrease the onset temperature of cure and/or decrease the cure peak temperature.

Alternatively, and/or in addition to their impact on curing conditions, these compounds comprising the pyrazine moiety may also have a significant impact on the physical and chemical properties of the resultant cured resin. Although not wanting to be limited by theory, in one embodiment, it is believed that these compounds comprising a pyrazine moiety may interact as a surface agent, enhancing the bond between the epoxy resin composition and the substrate. For example, the pyrazine moiety may be able to chelate to metal surfaces. Thus, it may be advantageous to include a second moiety onto the compound comprising the pyrazine moiety to more favorably interact with the epoxy resin, such as a hydroxy, secondary amine, thiol, nitrile, carboxylic acid, phenol, and/or isocyanate moiety.

In another embodiment, the compound comprising a pyrazine moiety may impact the bulk properties of the epoxy resin to impart unique characteristics to the resultant cured epoxy resins such as improved adhesion, chemical or corrosion resistance, altered glass transition temperatures, and/or other properties.

The epoxy resin compositions disclosed herein may be used as adhesives (i.e., bonding two different materials together) or as a coating (e.g., pipe coatings). The ratios of crosslinkable epoxy resin to curing agent to the compound comprising a pyrazine moiety and the amounts and types of additives can be selected to optimize the formulation for its given purpose. The compositions disclosed herein may be a one-part epoxy composition or a two-part epoxy composition, wherein the curing agent is stored separately from the crosslinkable epoxy resin until just before use.

The curable compositions of the present disclosure may comprise additional components to further alter and/or improve the physical properties and/or performance of the resulting epoxy resin. Such components include: adhesion promoter, fillers, tougheners, cure accelerators, pigments, flow modifiers, leveling agents, wetting agents, degassing agents, and waxes.

In one embodiment, an adhesion promoter may be added to the composition to improve the adhesion of the epoxy resin to a substrate. Adhesion promoters may function by forming a new layer at the interface which binds strongly to both the substrate and the adhesive or coating. The resultant interfacial region may also be more resistant to chemical attack from the environment. The specific type of adhesion promoter may vary depending upon the type of resin utilized and the composition of the surface to which it will be adhered. The most common commercial adhesion promoters are organosilanes, in which the organofunctional portion bonds with the resin in the adhesive or the organic medium, and the silane portion forms strongly adsorbed siloxane and/or polysiloxane regions on the substrate surface. Exemplary organosilane adhesion promoters include -aminopropyltrimethoxysilane or -mercaptopropyltrimethoxysilane. Another type of commonly utilized adhesion promoters are organometallic compounds such as titanates and zirconates. These organometallic adhesion promoters primarily improve adhesion at the interfacial region by forming a very thin, amorphous, primarily inorganic coating layer. Exemplary organometallic adhesion promoters include isopropyl tri(N-ethylaminoethylamino)titanate, tetraisopropyl di(dictylphosphito)titanate, neoalkoxytrisneodecanoyl zirconate, or zirconium propionate. Certain adhesion promoters have been found to be particularly useful for surfaces coated with ionic type lubricants used to facilitate the drawing of metal stock during processing, and include, for example, dihydric phenolic compounds such as catechol and thiodiphenol. A variety of other adhesion promoters exist, and have been demonstrated to improve performance with certain types of epoxy resins or substrates. Examples of other types of adhesion promoters includes hydroxyl amines (e.g., tris (hydroxymethyl)aminomethane), polyhydric phenol (e.g. pyrogallol, gallic acid, or tannic acid); and plastisols, which are suspensions of polyvinyl chloride particles in a plasticizer; and combinations thereof.

The amount of adhesion promoter used may be in the range of at least 0.5, 1, 1.5, or even 2% and at most 3.5, 4, 4.5, or even 5% by weight based on the crosslinkable epoxy resin.

In one embodiment, a toughening agent may be added to improve the durability of the curable composition. The general use of tougheners in epoxy resins is well-known. They generally comprise elastomer molecules and similar compounds that are incorporated into the resin composition, but which do not necessarily become chemically involved in the curing process. That is, the compounds may sometimes remain independent in the matrix defined by the cured resin. The amount of toughening agent to be used depends in part upon the final physical characteristics of the cured resin desired, and is generally determined empirically. In one embodiment, the toughening agent comprises 2-40% and preferably about 4-20% by weight of the crosslinkable epoxy resin. Exemplary commercially available toughening agents include: carboxylated acrylonitrile/butadiene vulcanizable elastomer precursors (such as those available under the trade designations "HYCAR CTBNX" and "HYCAR 1072" from B. F. Goodrich Chemical Co.); butadiene polymer (available under the trade designation "HYCAR CTB" from B.F Goodrich Chemical Co.); and core/shell polymers, such as methacrylate-butadiene-styrene (MBS) copolymer wherein core is cross-linked styrene/butadiene rubber and shell is polymethylacrylate (available under the trade designation "ACRYLOID KM653" and "ACRYLOID KM680" from Rohm and Haas). A typical, preferred, list of tougheners comprises: acrylic core/shell polymers; styrene-butadiene/methacrylate core/shall polymers; polyether polymers; carboxylated acrylonitrile/butadienes; and, carboxylated butadienes.

In one embodiment, the composition may further comprise a cure accelerator, which is used to decrease the cure temperature and increase the cure rate. Examples of cure accelerators include: an imidazole, an epoxy amine adduct, a urea, a tertiary amine and combinations thereof. Exemplary imidazole compounds include diphenyl imidazole and 2-ethyl-4-methylimidazole. An example of a suitable commercially available cure accelerator includes, but is not limited to, that sold under the trade designation "EPI-CURE Curing Agent P100", available from Hexion Specialty Chemicals, Columbus, Ohio.

In one embodiment, the composition may comprise a pigment, which is added to impart color into the resulting composition. Pigments include, for example, ferric oxide, brick dust, carbon black, and titanium oxide. Examples of suitable commercially available pigments include those under the trade designations: "SMC 1108" titanium dioxide anatase, available from Special Materials Company, Doylestown, Pa.; "TI-PURE R-960", available from DuPont, Wilmington, Del.; "HOSTAPERM GREEN GC 01" available from Clariant Pigments and Additives, Clariant, R.I.; and Phthalocyanine Green Toner, available from Sun Chemical Co., Parsippany, N.J.

In one embodiment, the composition may comprise a flow modifier to improve the quality of the coated composition. Examples of suitable flow modifiers include, but are not limited to: degassing or defoaming agents, leveling agents, and wetting agents. Example of suitable commercially available flow modifying agents include those under the trade designations: "RESIFLOW PF-67", available from Estron Chemical, Inc., Calvert City, Ky.; and "BYK-360 P", available from BYK Chemie, Wallinford, Conn. Examples of suitable waxes include, but are not limited to: polyethylene wax, synthetic wax, and polytetrafluoroethylene. Examples of commercially available waxes include those under the trade designations MPP 620F, available from Micro Powders, Inc., Tarrytown, N.Y. and "CERAFLOUR 980" available from BYK Chemie, Wallinford, Conn.

In one embodiment, an additive may be used to control the rheology or flow of the composition. In the case of powder coating compositions, these same additives can act as fluidizing agents, allowing for application of the coating by spray or fluidized bed. Examples of such additive include fumed silicas, such as hydrophobic and hydrophilic fumed silicas, and fumed aluminum oxides. Examples of hydrophobic fumed silicas include, but are not limited to, those available under the trade designations "HDK N20", "HDK T30", and "HDK T40" from Wacker Silicones, Adrian, Mich.; and "CAB-O-SIL M-5", "CAB-O-SIL HS-5", "CAB-O-SIL E5H", and "CAB-O-SIL HP-60" from Cabot Corp., Tuscola, Ill. Examples of hydrophilic fumed silicas include, but are not limited, those to those available under the trade designations "HDK H-15" and "HDK H-18" from Wacker Silicones, Adrian, Mich., treated fumed silica, available under the trade designation "CAB-O-SIL TS 720", and untreated fumed silica available under the trade designation "CAB-O-SIL M5", from Cabot Corp. and that available under the trade designation "CAB-O-SIL CT 1221" from Cabot Corp., Tuscola, Ill. An example of a fumed aluminum oxide is that available under the trade designation "AEROSIDE ALU C", from Evonik, Allen, Tex.

The epoxy adhesive composition may also contain a filler, e.g., aluminum powder, carbon black, glass bubbles, talc, clay, calcium carbonate, calcium metasilicate, calcium sodium aluminum silicate, magnesium sulfate, calcium sulfate, beryllium aluminum silicate, barium sulfate, titanium dioxide, silicas, silicates, glass beads, mica, and combinations thereof. Examples of suitable commercially available filler materials include those under the trade designations: "NYAD M325" (NYCO Minerals, Inc., Willsboro, N.Y.); "VANTALC 2000", "VANSIL W-20" and "VANSIL W-50" (R. T. Vanderbilt Company, Inc., Norwalk, Conn.); "MINSPAR 3", "MINSPAR 4", "MINSPAR 7", and"MINSPAR 10" (Imerys Performance Materials, Roswell, Ga.); "PURTALC 6030", available from Charles B. Chrystal Co., Inc., New York, N.Y.; "CIMBAR PC" available from CIMBAR, Cartersville, Ga.; "HUBERBRITE 10" available from Huber Engineered Materials, Atlanta, Ga.; and "EXBAR 200", "EXBAR 325" and "EXBAR 400", available from Excalibar Minerals, LLC, Houston, Tex. In some embodiments, the filler component may optionally not be required, depending on the particular use.

The epoxy adhesive composition may also contain one or more conventional additives such as, fire retardants, antistatic materials, thermally and/or electrically conductive particles, and expanding agents including, for example, chemical blowing agents such as azodicarbonamide or expandable polymeric microspheres containing a hydrocarbon liquid, such as those sold under the trade designation "EXPANCEL" by Expancel Inc. (Duluth, Ga.). These additives are typically added in amounts to produce the desired effect in the resulting adhesive.

In the preparation of adhesives, the epoxy composition of the disclosure can be prepared by heating and mixing one or more crosslinkable epoxy resins at an elevated temperature typically between about 100° C. to about 180° C. to melt the resins. The resin is then cooled to about 90-150° C. and other epoxy resins, reactive diluents, and tougheners are added under high shear mixing. If core-shell polymers are included in the composition, they are added as particles at this point and mixed, typically for up to one hour, until the particles are dispersed. Finally fillers are added and mixed to obtain a substantially homogeneous dispersion. The composition is then further cooled to below the glass transition temperature of the thermoplastic particles, typically between about 50-100° C., before the curatives, adhesion promoters, and thermoplastic particles are mixed into the epoxy composition. At this point, the epoxy composition is typically in a flowable state so that it can be poured into a suitable container for storage until it is used.

In the preparation of powder coating compositions, the epoxy composition of the disclosure can be prepared by dry blending the materials and then melt-mixing them as known in the art and disclosed for example, in the Example Section below.

The resin compositions of the disclosure are useful, for example: as structural adhesives; as films or protective coatings for various articles such as appliances; as impregnating and embedding materials for electrical components; and, in other uses, especially those wherein the operating temperature of the article or material is expected to be substantially elevated over room temperature.

In one embodiment of the present disclosure, the curable epoxy composition is formed into an adhesive that can be used to bond like and dissimilar substrates to each other in any of a variety of assembly applications. The adhesive may be formed into a film, which can be laminated onto a release liner, and/or die cut to fit the size and shape of the substrate to be bonded. In another embodiment, the adhesive may be directly coated onto a substrate to be bonded.

Due to their physical and chemical properties such as resistance to chemical attack and good adhesion to various substrates epoxy resins in general, the curable epoxy compositions of the present disclosure can be used in the preparation of coatings. In one embodiment of the present disclosure, the curable epoxy composition is used as a powder coating, wherein the epoxy resin is applied as a free-flowing dry powder and then heated to create a hard finish. Typically, epoxy resins are blended with curing agents and optionally cure accelerants, materials which are essentially inert at ambient temperatures, but will react with epoxide groups in the epoxy resin at elevated temperatures to form a hard thermoset coating. Epoxy systems prepared in this fashion can provide formulations that are suitable for the effective coating of steel surfaces such as pipelines.

Further, federal regulations also require that major pipelines be cathodically protected in order to decrease failures due to corrosion. Cathodic protection refers to the reduction or elimination of corrosion by making the metal a cathode by means of an impressed direct current or attachment to a sacrificial anode, usually magnesium, aluminum, or zinc. Although this cathodic protection is generally effective in reduction of corrosive effects, the presence of breaks or imperfections in the pipeline coating, known as "holidays", can lead to problems. Negative charge which is present due to the cathodic protection, in combination with moisture and minerals in the soil, may accelerate disbondment of the protective coating in the areas of holidays and lead to eventual corrosion of the pipeline. Due to this phenomenon, it is important to identify and develop epoxy resin compositions which exhibit high resistance to cathodic disbondment and thus can serve as effective protective pipeline coatings under highly corrosive environments.

Exemplary embodiment of the present disclosure include, but are not limited to:

Embodiment 1

A curable composition comprising:
a crosslinkable epoxy resin;
an epoxy curing agent; and
a compound comprising a pyrazine moiety wherein the compound does not comprise a primary amine.

Embodiment 2

The curable composition of embodiment 1, wherein the curable composition further comprises an adhesion promoter.

Embodiment 3

The curable composition of embodiment 2, wherein the adhesion promoter is selected from at least one of: a hydroxyl amine, a silane, a titanate, polyhydric phenol, and a plastisol.

Embodiment 4

The curable composition of embodiment 3, wherein the adhesion promoter is tris(hydroxymethyl)aminomethane.

Embodiment 5

The curable composition of any one of the previous embodiments, wherein the compound is selected from at least one of:

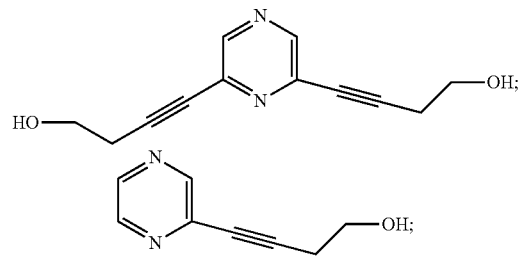

and

Embodiment 6

The curable composition of any one of the previous embodiments, wherein the crosslinkable epoxy resin is selected from at least one of: a diglycidyl ether of polyhydric phenols.

Embodiment 7

The curable composition of any one of the previous embodiments, wherein the crosslinkable epoxy resin is selected from at least one of: epoxy novolak resins, epoxy cresol novolak resins, epoxy phenol novolak resins, and isocyanate-modified epoxy resins.

Embodiment 8

The curable composition of any one of the previous embodiments, wherein the crosslinkable epoxy resin has a softening temperature of greater than 75° C.

Embodiment 9

The curable composition of any one of the previous embodiments, wherein the epoxy curing agent is selected from at least one of: a phenolic hardener, a guanidine, an anhydride, a thiol, dicyandiamide, an amine, a polyamide, dihydrazides, a carboxylic acid and carboxylic acid functional resin.

Embodiment 10

The curable composition of embodiment 9, wherein the curing agent is selected from at least one of dicyandiamide; 3',4'-benzophenone tetracarboxylic dianhydride; tetramethyl guanidine; bisphenol A, bisphenol A—terminated curing agent, isophthaloyl dihydrazide, and 4,4'-diaminodiphenyl sulfone.

Embodiment 11

The curable composition of any one of the previous embodiments, further comprising at least one of: a filler, a toughener, a cure accelerator, a pigment, a flow modifier, a leveling agent, a wetting agent, a degassing agent, and a wax.

Embodiment 12

The curable composition of any one of the previous embodiments, further comprising a cure accelerator.

Embodiment 13

The curable composition of embodiment 12, wherein the cure accelerator is selected from at least one of: an imidazole, an urea, and a tertiary amine.

Embodiment 14

An article comprising a substrate and the cured composition of any one of the previous embodiments on the surface of the substrate.

Embodiment 15

The article of embodiment 14, wherein the substrate is a metal.

Embodiment 16

The article of any one of embodiments 14-15, wherein the article is a pipe.

Embodiment 17

A method of making adhering substrates comprising:
  providing a first substrate and second substrate;
  providing a curable epoxy resin composition between the first substrate and the second substrate, wherein the curable epoxy resin composition comprises:
    a crosslinkable epoxy resin;
    a curing agent; and
    a compound comprising a pyrazine moiety wherein the compound does not comprise a primary amine; and
  curing the curable epoxy resin composition.

Embodiment 18

An article comprising:
  a substrate having an outer surface; and
  a coating deposited on at least a portion of the outer surface, wherein the coating comprises a crosslinkable epoxy resin; a curing agent; and a compound comprising a pyrazine moiety wherein the compound does not comprise a primary amine.

Embodiment 19

A method of protecting a substrate, the method comprising: coating a substrate with the curable composition of any one of embodiments 1-13.

EXAMPLES

Advantages and embodiments of this disclosure are further illustrated by the following examples, but the particular materials and amounts thereof recited in these examples, as well as other conditions and details, should not be construed to unduly limit this disclosure. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent. Materials were used as received unless otherwise stated.

These abbreviations are used in the following examples: g=gram, kg=kilograms, min=minutes, mol=mole; cm=centimeter, mm=millimeter, ml=milliliter, L=liter, psi=pressure per square inch, MPa=megaPascals, and wt=weight.

| Materials | |
|---|---|
| Acetonitrile | EMD Chemicals, Inc.; Gibbstown, NJ |
| 2-Aminopyrazine | Oakwood Chemicals; West Columbia, SC |
| Bis(triphenyl-phosphine)palladium(II) dichloride | TCI America; Portland, OR |
| 3-Butyn-1-ol | Sigma Aldrich Chemical Co. |
| Chloropyrazine | Sigma Aldrich Chemical Co. |
| Copper (I) iodide | Sigma Aldrich Chemical Co. |
| Dichloromethane | EMD Chemicals, Inc.; Gibbstown, NJ |
| Epoxy Resin I | Medium molecular weight solid reaction product of epichlorohydrin and bisphenol A available under the trade designation "D.E.R. 664UE" from Dow Chemical Company; Midland, MI |
| Epoxy Resin II | Low molecular weight solid reaction product of epichlorohydrin and bisphenol A available under the trade designation "D.E.R. 6116" from Dow Chemical Company |
| Curing Agent II | Bisphenol A terminated epoxy resin with a phenolic equivalent weight of 580 grams which can be made following the procedure as described under "Solid Phenolic Hydroxyl Containing Compound" in Example 9 of U.S. Pat. No. 3,931,109 (Martin) |
| Curing Agent I | Dicyandiamide, available under the trade designation "DYHARD 100M" from AlzChem LLC; Atlanta, GA |
| 2,6-Dichloro-pyrazine | Sigma Aldrich Chemical Co. |
| Ethyl acetate | EMD Chemicals, Inc.; Gibbstown, NJ |
| Formaldehyde | 37% aqueous solution, Alfa Aesar; Ward Hill, MA |
| Formic acid | 88% aqueous solution, Mallinckrodt Baker, Inc.; Paris, KY |
| Glyoxal | 40% aqueous solution, Sigma Aldrich Chemical Co. |
| Hexane | EMD Chemicals, Inc.; Gibbstown, NJ |
| Methanol | EMD Chemicals, Inc.; Gibbstown, NJ |
| Polyethylene | polyethylene particles, mean particle size of 7.0-9.0 micrometers, maximum particle size of 31.0 micrometers, available under the trade designation "MPP-620F" from Micro Powders, Inc.; Tarrytown, NY |
| Catalyst | Imidazole/epoxy resin adduct, available under the trade designation "EPIKURE P-100" from Momentive Specialty Chemicals Inc.; Columbus, OH |
| Phthalocyanine Green Toner | Phthalocyanine Green Toner from Sun Chemical Co.; Parsippany, NJ |
| Flow control agent | Acrylic polymer silica mix available under the trade designation "RESIFLOW PF-67" from Estron Chemical, Inc.; Calvert City, KY |
| Silica gel | 230-400 Mesh, Alfa Aesar; Ward Hil, MA |
| Titanium Dioxide | Available under the trade designation "SMC 1108 TITANIUM DIOXIDE ANATASE" from Special Materials Company, Doylestown, PA |
| Triethylamine | EMD Chemicals, Inc.; Gibbstown, NJ |
| Adhesion promoter | Tris(hydroxymethyl)aminomethane, Alfa Aesar; Ward Hill, MA |
| Wollastonite | Calcium metasilicate, available under the trade designation "VANSIL W-20" from R. T. Vanderbilt Company, Norwalk, CT |
| Fumed Silica | Available under the trade designation "HDK T30" from Wacker Chemical Corp.; Adrian, MI |

Preparations of Compounds
Pyrazine I: Bis-Alkynyl Pyrazine

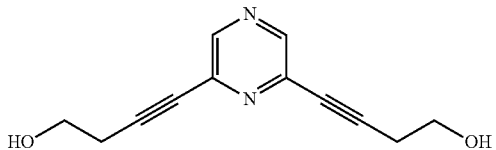 [SMILES: OCCC#Cc1cncc(C#CCCO)n1]

A 500 mL three neck round-bottomed flask was equipped with a reflux condenser, pressure-equalizing addition funnel, and magnetic stirbar. 2,6-dichloropyrazine (14.0 g, 94.0 mmol), 3-butyn-1-ol (16.5 g, 235 mmol), triethylamine (39.4 mL, 282 mmol), and 200 mL acetonitrile were added to the flask, and the resultant solution was degassed using several cycles of evacuation/nitrogen back flow. Copper iodide (1.80 g, 9.40 mmol) and bis(triphenylphosphine) palladium(II) dichloride (1.65 g, 2.35 mmol) were added to the solution, and the degassing procedure was repeated. The reaction mixture was heated at reflux overnight under nitrogen atmosphere with vigorous stirring. Silica gel was added to the reaction mixture, and the volatile components were evaporated under reduced pressure. The adsorbed material was loaded onto a silica gel filter column and eluted with ethyl acetate to afford the product (11.6 g, 57% of theoretical yield) as a yellow solid, which was confirmed by $^1$H NMR.

Pyrazine II: Mono-Alkynyl Pyrazine

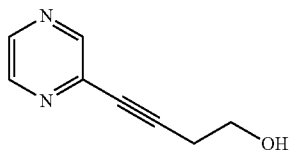 [SMILES: OCCC#Cc1cnccn1]

A 500 mL three neck round-bottomed flask was equipped with a reflux condenser, pressure-equalizing addition funnel, and magnetic stirbar. Chloropyrazine (18.3 g, 160 mmol), 3-butyn-1-ol (13.5 g, 192 mmol), triethylamine (33.4 mL, 240 mmol), and 130 mL acetonitrile were added to the flask, and the resultant solution was degassed using several cycles of evacuation/nitrogen back flow. Copper iodide (3.04 g, 16.0 mmol) and bis(triphenylphosphine) palladium(II) dichloride (1.40 g, 2.00 mmol) were added to the solution, and the degassing procedure was repeated. The reaction mixture was heated at reflux overnight under nitrogen atmosphere with vigorous stirring. Silica gel was added to the reaction mixture, and the volatile components were evaporated under reduced pressure. The adsorbed material was loaded onto a silica gel filter column and eluted with 4/1 ethyl acetate/hexane to afford the product (19.2 g, 81% of theoretical yield) as a yellow solid which was confirmed by 1H NMR.

Pyrazine III: Bis-Pyrazinyl Imidazolidine

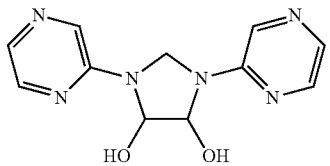 [SMILES: OC1C(O)N(c2cnccn2)CN1c1cnccn1]

A 1 L round-bottomed flask equipped with magnetic stirbar was charged with 2-aminopyrazine (38.04 g, 400 mmol, 2.0 eq.). Acetonitrile (300 mL) was added, followed by formic acid (2.1 g of an 88 wt % aqueous solution, 40 mmol, 0.2 eq.). Upon stirring the mixture quickly becomes a clear orange solution. A solution of formaldehyde (16.23 g of a 37 wt % aqueous solution, 200 mmol, 1.0 eq.) and glyoxal (29.02 g of a 40 wt % aqueous solution, 200 mmol, 1.0 eq.) was added via pipette over several minutes. The resultant mixture was allowed to stir at room temperature for 72 hours, during which time a grey precipitate forms. This precipitate was collected by filtration, washing with additional acetonitrile until the originally dark filtrate becomes colorless. The precipitate was dried under vacuum to afford the desired product, which was confirmed by $^1$H NMR.

Imidazolidine I: Bis-Benzyl Imidazolidine

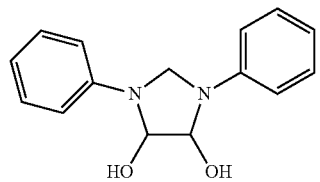 [SMILES: OC1C(O)N(c2ccccc2)CN1c1ccccc1]

To a 1 L round-bottomed flask equipped with magnetic stirbar was added aniline (27.94 g, 300 mmol, 2.0 eq.), H$_2$O (200 mL), and formic acid (1.6 g of an 88 wt % aqueous solution, 30 mmol, 0.2 eq.). While this mixture was vigorously stirred, a solution of formaldehyde (12.20 g of a 37 wt % aqueous solution, 150 mmol, 1.0 eq.) and glyoxal (21.80 g of a 40 wt % aqueous solution, 150 mmol, 1.0 eq.) in H$_2$O (50 mL) was added dropwise via addition funnel over 15 minutes. Upon formation of a thick material at the bottom of the reaction flask, acetonitrile (200 mL) was added, and the resultant mixture was allowed to stir at room temperature for 72 hours, during which time a tan precipitate was formed. This precipitate was collected via filtration and dried under vacuum to afford the bis-phenyl imidazolidine (29.8 grams, 78% of theoretical yield), whose structure was confirmed by 1H NMR.

Methods

Differential Scanning Calorimetry (DSC)

DSC was performed on a TA Instruments Inc., Q2000 model, New Castle, Del. DSC samples were typically 6 to 20 mg. Testing was done in sealed, aluminum, T-zero sample pans, at a rate of 10° C./min from room temperature (25° C.) to 300° C. The data from the reaction process was graphed on a chart showing heat flow versus temperature. The integrated area under an exothermic peak represents the total exotherm energy produced during the reaction and is measured in Joules/gram (J/g); the exotherm energy is proportional to extent of cure (that is, degree of polymerization). The exotherm profile (that is, the onset temperature (the temperature at which reaction will begin to occur), the peak temperature, and the end temperature) provides information on conditions needed to cure the monomer sample Cathodic Disbondment Test Steel panel specimens (4 inch×4 inch×0.25 inch (102 mm×102 mm×6.35 mm)) were solvent washed (in accordance with SSPC-SP1, Solvent Cleaning specification by The Society for Protective Coatings) with methylethyl ketone followed by an isopropanol rinse. When dry, both major surfaces of the steel surface were grit-blasted to a near-white finish in accordance with NACE No. 2/SSPC- SP10 1508501-5A2.5 (Near-White Blast Cleaning by The Society for Protective Coatings). The steel panel specimens were pre-heated in an oven at 465° F. (240° C.) for approximately one hour.

After removal from the oven, the steel panel specimens immediately were dipped into a fluid bed comprising the powdered epoxy coating samples (e.g., Comparative Example A and Examples 1-6) for an approximate length of time (from about 1 second to about 10 seconds) so as to give a desired coating thickness. The epoxy-coated steel panel specimens were placed in an oven set at 465° F. (240° C.) for two minutes to post-cure the epoxy resin, removed from the oven, air-cooled for 1 minute, then quenched in a water bath for 2 minutes. The epoxy-coated steel panel specimens were then removed from the water bath and dried.

A method similar to that disclosed in the Canadian Standards Association (CSA) 2245.20-06-12.8 "Plant-applied External Coatings for Steel Pipe" was used to test the resistance of the samples to cathodic disbondment.

In the center of the epoxy-coated steel panel specimens, a 0.125 inch (3.2 mm) diameter hole (or holiday) was drilled just through the epoxy coating. A test cell was then made by attaching a clear polycarbonate tube (3 inch (76 mm) outer diameter, 0.25 inch (6.35 inch) wall thickness and 6 inches (152 mm) long) over the center of the epoxy-coated steel panel specimen comprising holiday, which then served as the bottom of the test cell. A silicone sealant was used to seal and attach polycarbonate tube to the epoxy-coated steel panel specimen. A 3 wt % aqueous solution of sodium chloride in deionized water was placed into the test cell and used as the electrolyte, while a platinum wire was used as the anode. A potential difference of −1.5 volts of direct current was applied between the exposed metal surface and a calomel reference electrode.

The test cell was then placed in an air circulating oven at either 65° C. or 95° C. so that the testing was conducted at an elevated temperature. The actual potential difference and the level of the electrolyte were checked periodically and adjusted as necessary.

Within 1 hour of the conclusion of the testing period (either 14 or 28 days), the adhesion near the holiday was evaluated as follows. First, the test cell was dismantled and the polycarbonate tube was removed from the epoxy-coated steel panel specimen comprising the holiday. Eight radial cuts were made on the epoxy-coated steel panel specimen using a utility knife. The cuts originated from the holiday and extended to at least the edge of the "bottom" of the test cell (i.e., where the polycarbonate tube was located). The utility knife was then used, with leveraging action, to chip off (or bend away) the epoxy coating from the steel surface. The distance from the outer edge of the holiday to the edge of the remaining coating was measured at eight points corresponding to position of the eight radial cuts. The average of these eight measurements was recorded as the disbondment radius for the cell. For each composition, three specimens were tested (unless otherwise stated) and the disbondment value reported is the average of the disbondment radius of the three specimens (unless otherwise stated).

Comparative Example A (CE A) and Examples 1-5 (Ex1-Ex 5)

Powdered epoxy coating samples were prepared by dry blending the materials as shown in Table 1 below. The materials were dry blended in a high shear mixer (Thermo Prism model #B21R 9054 STR/2041, Thermo Electron, Newington, N.J.) at about 4000 revolutions per minute (rpm). After premixing, the samples were melt-mixed using a twelve-inch (about 30.5 cm) co-rotating twin screw extruder at a throughput of about 50-60 grams per minute. The extruded material was then ground and 0.45 wt % fumed silica was added. The final formulation was then blended again using the high shear mixer at 4000 rpm. After mixing, the samples were screened using a sieve with a 60 mesh screen.

TABLE 1

| | Examples (material amounts given in weight) | | | | | | |
|---|---|---|---|---|---|---|---|
| | CE A | Ex 1 | Ex 2 | Ex 3 | Ex 4 | Ex 5 | Ex 6 |
| Epoxy Resin I | 92.001 | 92.001 | 92.001 | 92.001 | 92.001 | 92.001 | 92.001 |
| Epoxy Resin II | 7.999 | 7.999 | 7.999 | 7.999 | 7.999 | 7.999 | 7.999 |
| Titanium dioxide | 0.846 | 0.846 | 0.846 | 0.846 | 0.846 | 0.846 | 0.846 |
| Phthalocyanine Green Toner | 0.033 | 0.033 | 0.033 | 0.033 | 0.033 | 0.033 | 0.033 |
| Flow control agent | 0.567 | 0.567 | 0.567 | 0.567 | 0.567 | 0.567 | 0.567 |
| Polyethylene | 0.228 | 0.228 | 0.228 | 0.228 | 0.228 | 0.228 | 0.228 |
| Curing Agent I | 2.027 | 2.027 | 2.027 | 2.027 | 2.027 | 2.027 | 2.027 |
| Catalyst | 1.197 | 1.197 | 1.197 | 1.197 | 1.197 | 1.197 | 1.197 |
| Curing Agent II | 0 | 2.8096 | 2.8096 | 2.8096 | 2.8096 | 2.8096 | 2.8096 |
| Pyrazine I | 0 | 0.7024 | 0 | 0 | 0.3512 | 0 | 0 |
| Pyrazine II | 0 | 0 | 0.7024 | 0 | 0 | 0.3512 | 0 |
| Pyrazine III | 0 | 0 | 0 | 0.7024 | 0 | 0 | 0.3512 |
| Adhesion promoter | 0 | 0 | 0 | 0 | 0.3512 | 0.3512 | 0.3512 |
| Wollastonite | 36.137 | 36.137 | 36.137 | 36.137 | 36.137 | 36.137 | 36.137 |

A sample of Comparative Example A and Examples 1-2 were each coated at 240° C. at a thickness of 10-12 mils (254-305 micrometers) and the Cathodic Disbondment Test Method described above was performed at 65° C. for 14 days. Shown in Table 2 are the average results for each sample from duplicate specimens.

TABLE 2

| | CE A | Ex 1 | Ex 2 |
|---|---|---|---|
| Cathodic disbondment (mm) | 16.51 | 5.76 | 5.86 |

A sample of Examples 2 and 5 were each coated at 240° C. at a thickness of 10-12 mils (254-305 micrometers) and the Cathodic Disbondment Test Method described above was performed at 65° C. for 14 days. A sample of Comparative Example A was not included in this experiment. Shown in Table 3 are the average results for each sample from duplicate specimens.

TABLE 3

|  | Ex 2 | Ex 5 |
| --- | --- | --- |
| Cathodic disbondment (mm) | 5.31 | 2.55 |

A sample of Comparative Example A and Example 4 were each coated at 240° C. at a thickness of 15 mils (381 micrometers) and the Cathodic Disbondment Test Method described above was performed at 65° C. for 28 days. Shown in Table 4 are the average results for Comparative Example A from duplicate specimens and for Example 4 from triplicate specimens.

TABLE 4

|  | CE A | Ex 4 |
| --- | --- | --- |
| Cathodic disbondment (mm) | 16.87 | 1.87 |

A sample of Example 3 and Example 6 were each coated at 240° C. at a thickness of 10-12 mils (254-305 micrometers) and the Cathodic Disbondment Test Method described above was performed at 65° C. for 14 days. A sample of Comparative Example A was not included in this experiment. Shown in Table 5 are the average results for each sample from triplicate specimens.

TABLE 5

|  | Ex 3 | Ex 6 |
| --- | --- | --- |
| Cathodic disbondment (mm) | 7.72 | 4.98 |

Comparative Example B (CE B) and Examples 7-9 (Ex 7-Ex 9)

A Base Resin was made comprising the following as listed in Table 6 below

TABLE 6

| Material | Amount in wt |
| --- | --- |
| Epoxy Resin I | 92.001 |
| Epoxy Resin II | 7.999 |
| Titanium dioxide | 0.846 |
| Phthalocyanine Green Toner | 0.033 |
| Flow control agent | 0.567 |
| Polyethylene | 0.228 |
| Curing Agent I | 2.027 |
| Wollastonite | 36.137 |

The materials were dry blending in a high shear mixer (Thermo Prism model #B21R 9054 STR/2041, Thermo Electron, Newington, N.J.) at about 4000 revolutions per minute (rpm). After premixing, the material was melt-mixed using a twelve-inch (about 30.5 cm) co-rotating twin screw extruder at a throughput of about 50-60 grams per minute. The extruded material was then ground and 0.45 wt % fumed silica was added. The final formulation was then blended again using the high shear mixer at 4000 rpm. After mixing, the material was screened using a sieve with a 60 mesh screen to provide the Base Resin.

Samples were prepared using: 1 gram of Base Resin, above, and, if used, 0.03 g of the compound comprising a pyrazine moiety. The samples were placed in a vial along with a polymethyl methacrylate ball pestle (⅜ inch (9.5 micron) diameter, for use in a grinder/mixer available under the trade designation "WIG-L-BUG") and the vial capped. The vials were shaken on a WIG-L-BUG grinder/mixer for 1 min. Each of the samples was then tested by the DSC Method described above for cure onset and the cure peak temperature. The results are shown in Table 7 below.

TABLE 7

|  | CE B | Ex 7 | Ex 8 | Ex 9 |
| --- | --- | --- | --- | --- |
| Pyrazine Added | None | Pyrazine I | Pyrazine II | Pyrazine III |
| Cure onset (° C.) | 136 | 123 | 122 | 117 |
| Cure peak (° C.) | 210 | 201 | 199 | 175 |

Comparative Examples C and D (CE C and CE D)

Epoxy resin samples were prepared by dry blending the materials as shown in Table 8 below. The materials were dry blended in a high shear mixer (Thermo Prism model #B21R 9054 STR/2041, Thermo Electron, Newington, N.J.) at about 4000 revolutions per minute (rpm). After premixing, the samples were melt-mixed using a twelve-inch (about 30.5 cm) co-rotating twin screw extruder at a throughput of about 50-60 grams per minute. The extruded material was then ground and 0.45 wt % fumed silica was added. The final formulation was then blended again using the high shear mixer at 4000 rpm. After mixing, the samples were screened using a sieve with a 60 mesh screen.

TABLE 8

|  | Examples (material amounts given in weight) | |
| --- | --- | --- |
|  | CE C | CE D |
| Epoxy Resin I | 92.001 | 92.001 |
| Epoxy Resin II | 7.999 | 7.999 |
| Wollastonite | 36.137 | 36.137 |
| Titanium dioxide | 0.846 | 0.846 |
| Phthalocyanine Green Toner | 0.033 | 0.033 |
| Flow control agent | 0.567 | 0.567 |
| Polyethylene | 0.228 | 0.228 |
| Curing Agent I | 2.027 | 2.027 |
| Catalyst | 1.197 | 1.197 |
| Curing Agent II | 0 | 2.8096 |
| Imidazolidine I | 0 | 0.7024 |

A sample of Comparative Examples C and D were each coated at 240° C. at a thickness of 15 mils (381 micrometers), and the Cathodic Disbondment Test Method described above was performed at 65° C. for 28 days. Shown in Table 9 are the average results for each sample from triplicate specimens.

TABLE 9

|  | CE C | CE D |
| --- | --- | --- |
| Cathodic disbondment (mm) | 13.88 | 14.66 |

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A curable composition comprising:
a crosslinkable epoxy resin;
an epoxy curing agent; and
a compound comprising a pyrazine moiety wherein the compound is selected from the group consisting of:

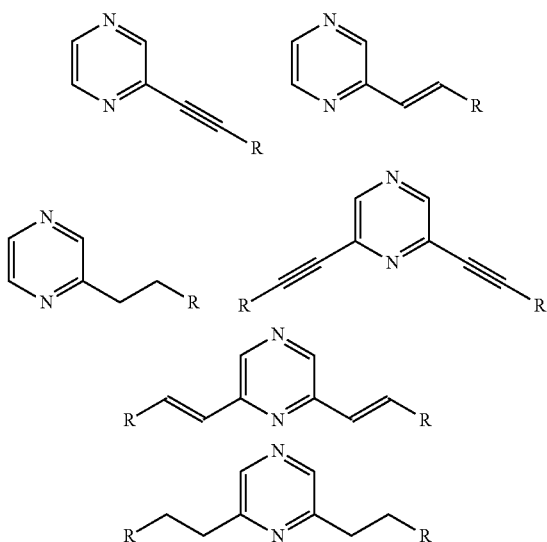

wherein R is independently selected from C1 to C4 alkyl, which may be optionally substituted by at least one of —OH, aryl, heteroaryl, pyrazyl, 2-hydroxyphenyl, 3-hydroxyphenyl, or 4-hydroxyphenyl group;

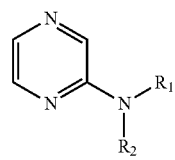

wherein $R_1$ is selected from —H, benzyl, and C1 to C6 alkyl group and $R_2$ is selected from —C(O)R', —C(O)NHR', benzyl, and C1 to C6 alkyl group, wherein R' is selected from C1 to C6 alkyl, aryl, benzyl and heteroaryl group;

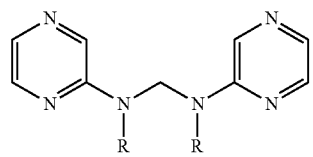

wherein R is independently selected from —H and C1 to C6 alkyl group;

and

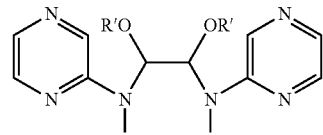

wherein R is independently selected from —H and C1 to C6 alkyl group or wherein the two Rs form a —CH$_2$— bond; and R' is independently selected from —H and C1 to C6 alkyl group.

2. The curable composition of claim 1, wherein the compound is selected from the group consisting of:

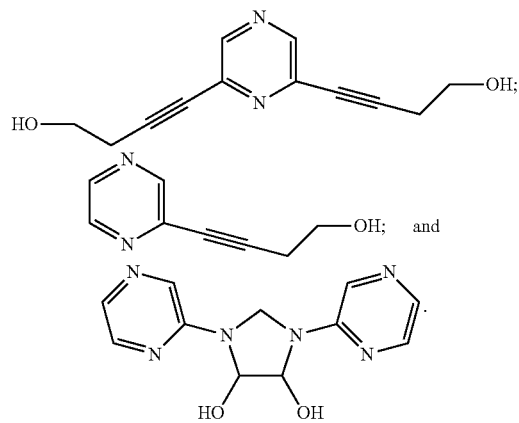

3. The curable composition of claim 1, wherein the crosslinkable epoxy resin is selected from the group consisting of: a diglycidyl ether of polyhydric phenols, epoxy novolak resins, epoxy cresol novolak resins, epoxy phenol novolak resins, and isocyanate-modified epoxy resins.

4. A method of making adhering substrates comprising:
providing a first substrate and second substrate;
providing a curable epoxy resin composition between the first substrate and the second substrate, wherein the curable epoxy resin composition comprises:
a crosslinkable epoxy resin;
a curing agent; and
a compound comprising a pyrazine moiety wherein the compound is selected from the group consisting of:

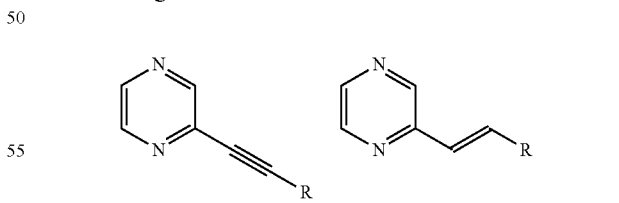
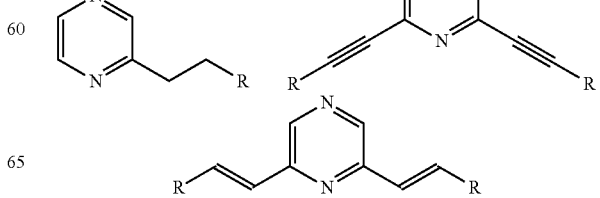

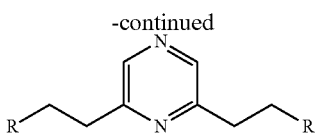

wherein R is independently selected from C1 to C4 alkyl, which may be optionally substituted by at least one of —OH, aryl, heteroaryl, pyrazyl, 2-hydroxyphenyl, 3-hydroxyphenyl, or 4-hydroxyphenyl group;

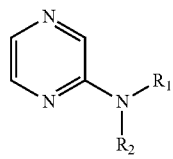

wherein $R_1$ is selected from —H, benzyl, and C1 to C6 alkyl group and $R_2$ is selected from —C(O)R', —C(O)NHR', benzyl, and C1 to C6 alkyl group, wherein R' is selected from C1 to C6 alkyl, aryl, benzyl and heteroaryl group;

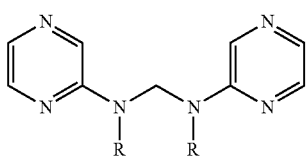

wherein R is independently selected from —H and C1 to C6 alkyl group; and

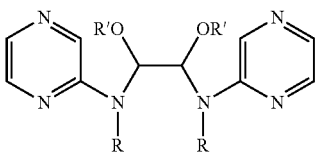

wherein R is independently selected from —H and C1 to C6 alkyl group or wherein the two Rs form a —CH$_2$— bond; and R' is independently selected from —H and C1 to C6 alkyl group; and
curing the curable epoxy resin composition.

5. An article comprising:
a substrate having an outer surface; and
a coating deposited on at least a portion of the outer surface,
wherein the coating comprises a crosslinkable epoxy resin; a curing agent; and a compound comprising a pyrazine moiety wherein the compound is selected from the group consisting of:

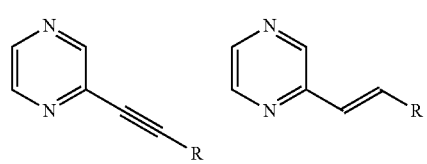

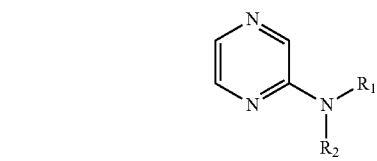

wherein R is independently selected from C1 to C4 alkyl, which may be optionally substituted by at least one of —OH, aryl, heteroaryl, pyrazyl, 2-hydroxyphenyl, 3-hydroxyphenyl, or 4-hydroxyphenyl group;

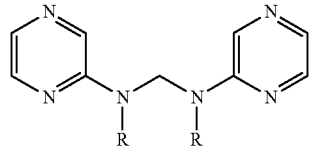

wherein $R_1$ is selected from —H, benzyl, and C1 to C6 alkyl group and $R_2$ is selected from —C(O)R', —C(O)NHR', benzyl, and C1 to C6 alkyl group, wherein R' is selected from C1 to C6 alkyl, aryl, benzyl and heteroaryl group;

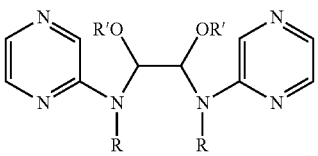

wherein R is independently selected from —H and C1 to C6 alkyl group;
and

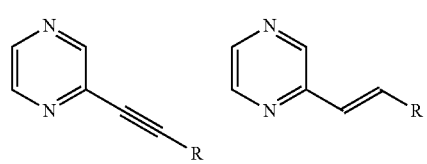

wherein R is independently selected from —H and C1 to C6 alkyl group or wherein the two Rs form a —CH$_2$— bond; and R' is independently selected from —H and C1 to C6 alkyl group.

6. The article of claim 5, wherein the substrate is a metal.

\* \* \* \* \*